United States Patent
Matsukuma et al.

(10) Patent No.: US 11,079,143 B2
(45) Date of Patent: Aug. 3, 2021

(54) HEAT PUMP

(71) Applicant: Kobe Steel, Ltd., Hyogo (JP)

(72) Inventors: Masaki Matsukuma, Takasago (JP); Takao Ohama, Tokyo (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 15/770,559

(22) PCT Filed: Oct. 19, 2016

(86) PCT No.: PCT/JP2016/080978
§ 371 (c)(1),
(2) Date: Apr. 24, 2018

(87) PCT Pub. No.: WO2017/073433
PCT Pub. Date: May 4, 2017

(65) Prior Publication Data
US 2019/0056152 A1 Feb. 21, 2019

(30) Foreign Application Priority Data

Oct. 28, 2015 (JP) .............................. JP2015-212098

(51) Int. Cl.
*F25B 9/00* (2006.01)
*F02C 6/00* (2006.01)
(Continued)

(52) U.S. Cl.
CPC .............. *F25B 9/004* (2013.01); *F02C 1/04* (2013.01); *F02C 6/00* (2013.01); *F02C 6/04* (2013.01);
(Continued)

(58) Field of Classification Search
CPC .... F25B 9/00; F25B 1/00; F25B 30/02; F25B 9/004; F25B 2300/00; F25B 2339/047;
(Continued)

(56) References Cited

U.S. PATENT DOCUMENTS 4,523,432 A 6/1985 Frutschi
5,495,709 A * 3/1996 Frutschi ............... F01K 21/047
60/39.55
(Continued)

FOREIGN PATENT DOCUMENTS

EP 3 358 167 A1 8/2018
JP S60-80036 A 5/1985
(Continued)

OTHER PUBLICATIONS

International Preliminary Report on Patentability issued in corresponding International Application No. PCT/JP2016/080978, dated May 11, 2018; with English translation.
(Continued)

*Primary Examiner* — Elizabeth J Martin
(74) *Attorney, Agent, or Firm* — Studebaker & Brackett PC

(57) ABSTRACT

A heat pump includes an electric motor driven by input electric power, a first compressor mechanically connected to the electric motor and compresses air, a first heat exchanger performing heat exchange between compressed air produced by the first compressor and water, and a first hot water outlet through which the water heated by heat exchange in the first heat exchanger is taken out. Thus, in the air refrigerant heat pump, it is possible to use only air and water to supply heating by applying part of compressed air energy storage technology to the heat pump.

4 Claims, 5 Drawing Sheets

(51) Int. Cl.
  *F02C 6/16* (2006.01)
  *F25B 30/02* (2006.01)
  *F24D 3/18* (2006.01)
  *F24D 3/00* (2006.01)
  *F02C 1/04* (2006.01)
  *F25B 1/00* (2006.01)
  *F02C 6/04* (2006.01)

(52) U.S. Cl.
  CPC ............... *F02C 6/16* (2013.01); *F24D 3/00* (2013.01); *F24D 3/18* (2013.01); *F25B 1/00* (2013.01); *F25B 9/00* (2013.01); *F25B 30/02* (2013.01); *F25B 2300/00* (2013.01); *F25B 2339/047* (2013.01); *F25B 2400/14* (2013.01); *F25B 2500/18* (2013.01); *Y02B 30/52* (2013.01); *Y02E 60/16* (2013.01)

(58) Field of Classification Search
  CPC .... F25B 2400/14; F25B 2500/18; F02C 1/04; F02C 6/00; F02C 6/04; F24D 3/00; F24D 3/18
  See application file for complete search history.

(56) References Cited

U.S. PATENT DOCUMENTS

| | | | | |
|---|---|---|---|---|
| 5,537,822 | A * | 7/1996 | Shnaid | ........... F02C 6/04 60/650 |
| 7,958,731 | B2 | 6/2011 | McBride et al. | |
| 2004/0192123 | A1 | 9/2004 | Mori et al. | |
| 2010/0251711 | A1 * | 10/2010 | Howes | ........... F01K 3/06 60/659 |
| 2011/0127004 | A1 | 6/2011 | Freund et al. | |
| 2014/0026584 | A1 | 1/2014 | Naeve | |
| 2015/0322874 | A1 * | 11/2015 | Scuderi | ........... G05B 15/02 700/287 |

FOREIGN PATENT DOCUMENTS

| | | |
|---|---|---|
| JP | H01-247966 A | 10/1989 |
| JP | H01-314829 A | 12/1989 |
| JP | H03065830 U | 6/1991 |
| JP | H05270252 A | 10/1993 |
| JP | H06-066435 A | 3/1994 |
| JP | H07-224679 A | 8/1995 |
| JP | H09-210484 A | 8/1997 |
| JP | 2001-115859 A | 4/2001 |
| JP | 2002-273497 A | 9/2002 |
| JP | 2003-065621 A | 3/2003 |
| JP | 2003-081185 A | 3/2003 |
| JP | 2005140444 A | 6/2005 |
| JP | 2013-512410 A | 4/2013 |
| JP | 2013-253775 A | 12/2013 |

OTHER PUBLICATIONS

International Search Report issued in PCT/JP2016/080978; dated Dec. 6, 2016.

The extended European search report issued by the European Patent Office dated May 9, 2019, which corresponds to EP16859663.3-1007 and is related to U.S. Appl. No. 15/770,559.

Communication pursuant to Article 94(3) EPC issued by the European Patent Office dated Nov. 20, 2020, which corresponds to European Patent Application No. 16859663.3-1007 and is related to U.S. Appl. No. 15/770,559.

* cited by examiner

HEAT PUMP

CROSS-REFERENCE TO RELATED APPLICATIONS

This is a national phase application in the United States of International Patent Application No. PCT/JP2016/080978 with an international filing date of Oct. 19, 2016, which claims priority of Japanese Patent Application No. 2015-212098 filed on Oct. 28, 2015 the contents of which are incorporated herein by reference.

TECHNICAL FIELD

The present invention relates to a heat pump. More specifically, the present invention relates to a heat pump using air as a refrigerant.

BACKGROUND ART

Conventional heat pumps mainly use a fluorocarbon-based refrigerant such as hydrofluorocarbon (HFC) or $CO_2$ as a refrigerant. Therefore, there is a fear that leakage of refrigerants causes global warming or increases $CO_2$ in the atmosphere. For this reason, heating and cooling systems using a natural refrigerant having no negative environmental effects on the global environment have been studied.

The coefficients of performance (COPS) of existing heat pumps under heat supply conditions of 90° C. and 7° C. are as follows.
Natural refrigerant ($CO_2$) heat pumps: COP 3.0
Absorption heat pumps: COP 1.5
Adsorption heat pumps: COP 0.6 to 0.7
Alternative freon heat pumps: COP 4.5
Air-refrigerant refrigerators: COP 0.44

As heat pumps using air that is an ultimate natural refrigerant, air-refrigerant refrigerators are known. However, the application of air-refrigerant refrigerators is limited to freezing at ultralow temperature, and air-refrigerant refrigerators have a COP of about 0.44 and are therefore not advantageous in terms of performance.

Further, a technique called "compressed air energy storage (CAES)" is known which is a technique for smoothing an unstable generated power output that irregularly fluctuates, such as renewable energy, with the use of air as a working fluid. A CAES generator disclosed in JP 2013-512410 A stores compressed air discharged from a compressor when surplus power is generated, and reconverts the compressed air into electricity with the use of an air-turbine generator when necessary.

SUMMARY OT THE INVENTION

Problems to be Solved by the Invention

The CAES generator disclosed in JP 2013-512410 A is intended to smooth an unstable generated power output that irregularly fluctuates, such as renewable energy, and Patent Document 1 does not particularly suggest the use of the CAES generator as a heat pump using air as a refrigerant.

It is an object of the present invention to provide an air-refrigerant heat pump that utilizes part of the technique of CAES to supply hot heat with the use of only air and water. Further, it is also an object of the present invention to provide an air-refrigerant heat pump improved to have higher efficiency than ever before.

Means for Solving the Problems

The present invention provides a heat pump comprising: an electric motor driven by input electric power; a first compressor mechanically connected to the electric motor and compresses air; a first heat exchanger performing heat exchange between compressed air produced by the first compressor and water; and a first hot water outlet through which the water heated by heat exchange in the first heat exchanger is taken out.

By increasing the temperature of the air with the use of compression heat generated by the first compressor and increasing the temperature of the water by heat exchange with the heated air in the first heat exchanger, it is possible to produce hot water and take out the hot water through the first hot water outlet. Further, since air and water are used as working fluids, leakage of the working fluids into the atmosphere has no negative environmental effects.

Preferably, the heat pump further comprises an expander driven by the compressed air produced by the first compressor; a load generator mechanically connected to the expander; a second heat exchanger performing heat exchange between air expanded by the expander and water; and a cold water outlet through which the water cooled by the heat exchange in the second heat exchanger is taken out. More preferably, the air expanded by the expander and supplied to the second heat exchanger has a temperature of −50° C. to −110° C.

By decreasing the temperature of the air by absorption of heat during expansion in the expander preferably to −50° C. to −110° C. and then cooling water by heat exchange with the cooled air in the second heat exchanger, it is possible to take out cold water from the cold water outlet. Since cold water as well as hot water can be taken out, it is possible to increase COP and improve performance.

Preferably, the heat pump further comprises a first accumulator storing the compressed air produced by the first compressor, wherein the expander is driven by the compressed air supplied from the first accumulator, wherein the load generator is a power generator, and wherein the power generator is driven by the expander to generate electric power.

By supplying the compressed air stored as energy in the first accumulator to the expander when necessary to drive the power generator to generate electric power, it is possible to simultaneously smooth electric power in addition to obtain cold heat and hot heat.

Preferably, the heat pump further comprises a second accumulator that fluidly connected to at least one of the expander and the first accumulator; and a second compressor compressing air to a pressure higher than that of the compressed air produced by the first compressor and supplies the compressed air to the second accumulator.

By providing the second accumulator and the second compressor, it is possible to supply emergency power and cold water over a long period of time in the event of an interruption of commercial electric power system. This is particularly effective for a demander, such as a data center or a large computer, which requires emergency power and a large amount of cold heat when a power failure occurs.

Preferably, the heat pump further comprises a switching mechanism switching a supply destination of the electric power generated by the power generator between the electric motor and a demander.

By providing the switching mechanism, it is possible to change a power supply destination when necessary. More specifically, electric power generated by the power generator can be effectively used by supplying the electric power to the demander in normal times and supplying the electric power to the electric motor to drive the first compressor when there is no demand for electric power from the demander. In particular, when there is no demand for electric power from the demander, electric power is cyclically used in the system, and therefore electric power that needs to be supplied from the outside of the system can be reduced. This can increase coefficient of performance (COP) and improve performance.

The load generator is preferably the electric motor.

By integrating the electric motor and the load generator, it is possible to reduce the number of components of the system. This can reduce the size of the system. In particular, when the load generator is a power generator, the first compressor and the expander may be mechanically connected to each other using a motor generator.

The heat pump preferably comprises a heat recovery mechanism recovering heat generated by the electric motor and the load generator to increase a temperature of water by the recovered heat to take out the water as hot water through a second hot water outlet.

This can recover heat generated by electric losses or mechanical losses caused by the electric motor or the like to produce hot water.

According to the present invention, it is possible to provide an air-refrigerant heat pump that utilizes part of the technique of CAES to supply hot heat with the use of only air and water. Further, it is possible to improve efficiency more than ever.

DESCRIPTION OF EMBODIMENTS

Hereinbelow, embodiments of the present invention will be described with reference to the accompanying drawings.

First Embodiment

Figure 1:
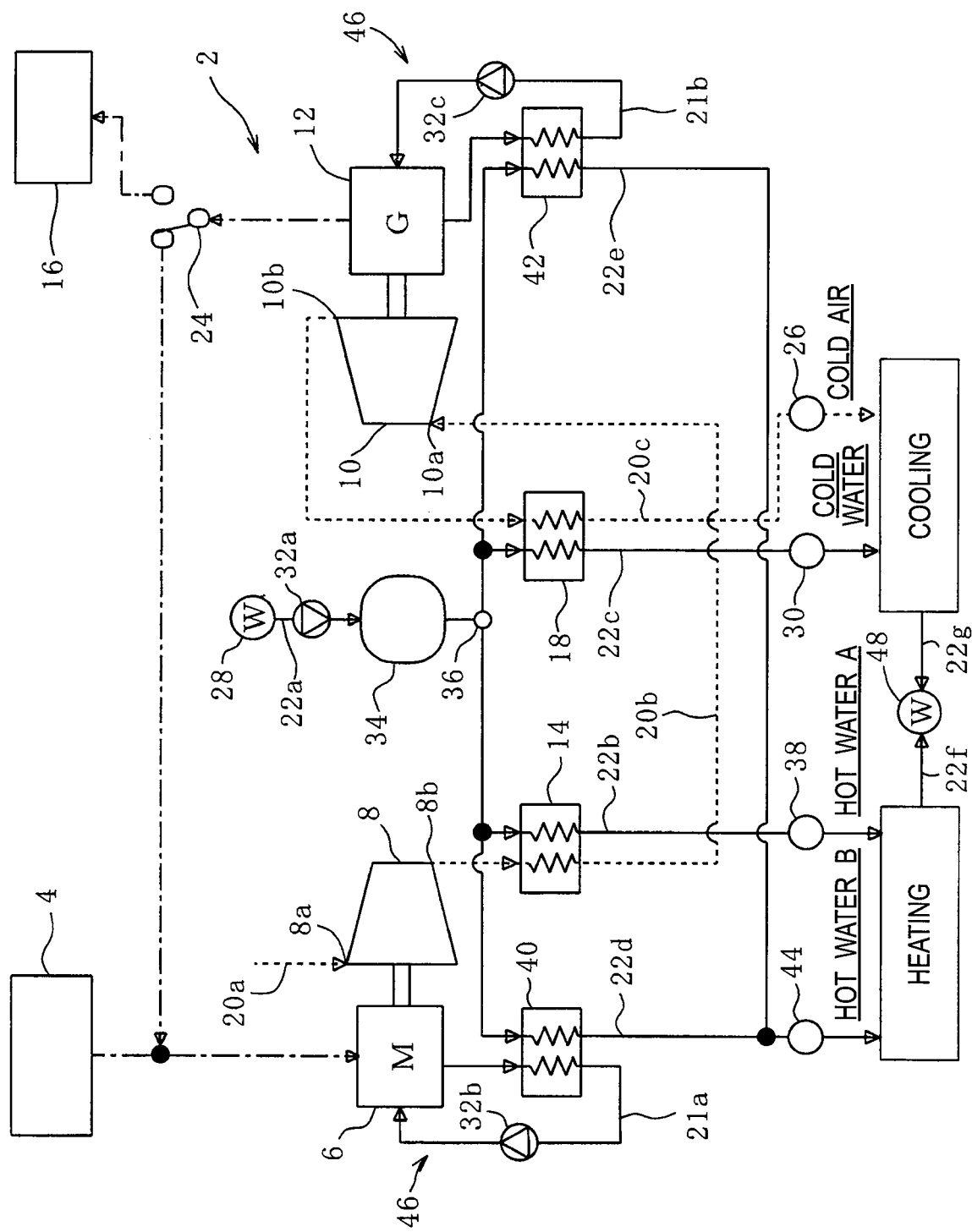
FIG. 1 is a schematic configuration diagram of a heat pump according to a first embodiment of the present invention.

FIG. 1 is a schematic configuration diagram of a heat pump 2 according to a first embodiment of the present invention. The heat pump 2 according to this embodiment receives input electric power from a power-generating unit 4, and produces two kinds of hot water (hot water A and hot water B), cold water, and cold air with the use of air as a refrigerant to use them for air heating and air cooling. Since air and water are used as working fluids, leakage of the working fluids into the atmosphere has no negative environmental effects.

The power-generating unit 4 used in this embodiment is one that utilizes renewable energy, such as a wind power-generating unit or a solar power-generating unit in terms of environmental friendliness, but the type of the power-generating unit 4 is not particularly limited. Alternatively, the power-generating unit 4 may be an electric power system or the like connected to a commercial power supply.

The heat pump 2 according to this embodiment includes a motor (electric motor) 6, a first compressor 8, an expander 10, a power generator (load generator) 12, a first heat exchanger 14, and a second heat exchanger 18 which are fluidly connected through air pipes 20a to 20c and water supply pipes 22a to 22g.

First, the paths of the air pipes 20a to 20c will be described.

Electric power generated by the power-generating unit 4 is supplied to the motor 6. Hereinafter, the electric power supplied from the power-generating unit 4 to the motor 6 is referred to as input electric power. The motor 6 is driven by the input electric power.

The first compressor 8 is mechanically connected to the motor 6, and is driven by the motor 6. The first compressor 8 has an outlet 8b fluidly connected to an air supply port 10a of the expander 10 through the air pipe 20b. When driven by the motor 6, the first compressor 8 sucks air through an air inlet 8a, compresses air, and pressure-feeds the compressed air discharged through the outlet 8b to the expander 10 through the air pipe 20b. The air pipe 20b is provided with the first heat exchanger 14.

In the first heat exchanger 14, heat exchange is performed between compressed air in the air pipe 20b that extends from the first compressor 8 to the expander 10 and water in the water supply pipe 22b that extends from a water supply unit 28 that will be described later to a first hot water outlet 38 to heat water in the water supply pipe 22b with the use of compression heat generated by the first compressor 8. That is, the first heat exchanger 14 decreases the temperature of compressed air and increases the temperature of water. The first heat exchanger 14 can adjust compressed air and water to their respective predetermined temperatures by adjusting the amount of heat exchange. In this embodiment, the first heat exchanger 14 increases the temperature of water to ordinary temperature or higher and decreases the temperature of compressed air to ordinary temperature or lower. Here, the ordinary temperature of water is, for example, the temperature of industrial water or the temperature of water after heat exchange with the atmosphere using a cooling tower, and is generally in the range of 5 to 30° C., and varies depending on the region and season. The ordinary temperature of air is the temperature of the atmosphere, and is generally in the range of 0 to 40° C., and varies depending on the region and season.

The expander 10 is mechanically connected to the power generator 12. When compressed air is supplied to the expander 10 through the air supply port 10a, the expander 10 is operated by the supplied compressed air and drives the power generator 12. The power generator 12 is electrically connected to an electric power system 16 and the motor 6 through a switch 24 (see the dashed-dotted line in FIG. 1). Therefore, electric power generated by the power generator 12 (hereinafter referred to as "generated power") is supplied to the electric power system 16 or the motor 6. The supply destination of generated power can be changed by operating the switch (switching mechanism) 24. The switch 24 may be operated according to demand power required by the electric power system 16. More specifically, when it is not necessary to supply electric power from the power generator 12 to the electric power system 16, the switch 24 is operated to supply generated power from the power generator 12 to the motor 6 of the first compressor 8 so that the heat pump 2 is operated only for heating and cooling. When it is necessary to supply electric power from the power generator 12 to the electric power system 16, the switch 24 is operated to supply generated power from the power generator 12 to the electric power system 16 so that the heat pump 2 is operated for both heating and cooling and power generation. In particular, when there is no demand for electric power from a demander and therefore it is not necessary to supply electric power from the power generator 12 to the electric power system 16, the heat pump 2 is operated only for cooling and heating so that electric power is cyclically used in the system. Therefore, electric power that needs to be supplied from the outside of the system to drive the motor 6 can be reduced, which can increase coefficient of performance (COP) and improve performance.

Air expanded by the expander 10 is cooled by absorption of heat during expansion and then sent into the air pipe 20*c* through an air outlet 10*b*. Compressed air supplied to the air supply port 10*a* of the expander 10, which has been cooled to ordinary temperature or less by the first heat exchanger 14, is further cooled by the expander 10 and is therefore reliably sent as cold air having ordinary temperature or less into the air pipe 20*c*. The air pipe 20*c* is provided with the second heat exchanger 18. The cold air cooled to ordinary temperature or less is supplied to the second heat exchanger 18 through the air pipe 20*c*.

In the second heat exchanger 18, heat exchange is performed between air having ordinary temperature or lower in the air pipe 20*c* that extends from the expander 10 to a cold air outlet 26 and water in the water supply pipe 22*c* that extends from a flow divider 36 that will be described later to a cold water outlet 30 to cool the water to ordinary temperature or lower. That is, the second heat exchanger 18 increases the temperature of air and decreases the temperature of water. However, the second heat exchanger 18 heats air so that the air is kept at ordinary temperature or lower by adjusting the amount of heat exchange. After the heat exchange in the second heat exchanger 18, air kept at ordinary temperature or lower, that is, cold air is supplied to the cold air outlet 26 through the air pipe 20*c* and taken out to the outside of the heat pump through the cold air outlet 26 to be used for cooling. Examples of a demander of cooling include a data center that requires a huge amount of cooling energy for cooling computers and a precision machine factory and a semiconductor device factory that are required to be adjusted to a constant temperature due to constraints imposed by manufacturing processes.

Hereinbelow, the paths of the water supply pipes 22*a* to 22*g* will be described.

Water supplied from the water supply unit 28 is allowed to flow by being pressurized by a pump 32*a* in the water supply pipe 22*a*. The water supply pipe 22*a* is provided with a cooling tower 34, and water in the water supply pipe 22*a* is cooled to a certain temperature by the cooling tower 34. The cooling temperature may be, for example, about ordinary temperature or may be determined on the basis of the amount of heat exchange in each of the heat exchanger 14, the heat exchange 18, a heat exchanger 40, and a heat exchanger 42. The water supply pipe 22*a* is divided into the water supply pipes 22*b* to 22*e* by the flow divider 36 provided downstream from the cooling tower 34.

One end and the other end of the water supply pipe 22*b* are connected to the flow divider 36 and the first hot water outlet 38, respectively. Water heated to ordinary temperature or higher by the first heat exchanger 14 provided in the water supply pipe 22*b* is taken out through the first hot water outlet 38 to the outside of the heat pump as hot water A, and the hot water A is used for heating etc.

One end and the other end of the water supply pipe 22*c* are connected to the flow divider 36 and the cold water outlet 30, respectively. Water cooled to ordinary temperature or lower by the second heat exchanger 18 provided in the water supply pipe 22*c* is taken out through the cold water outlet 30 to the outside of the heat pump as cold water, and the cold water is used for cooling etc. In this way, cold water as well as hot water can be taken out, which can increase coefficient of performance (COP) and improve performance.

One end and the other end of the water supply pipe 22*d* are connected to the flow divider 36 and a second hot water outlet 44. One end of the water supply pipe 22*e* is connected to the flow divider 36, and the water supply pipe 22*e* joins the water supply pipe 22*d*, which is provided downstream from the third heat exchanger 40, at the other end thereof. The water supply pipe 22*d* and the water supply pipe 22*e* are provided with the third heat exchanger 40 and the fourth heat exchanger 42, respectively to heat water inside thereof.

In this embodiment, the third heat exchanger 40 and the fourth heat exchanger 42 are provided to recover heat that is less than compression heat such as electric losses or mechanical losses caused by the motor 6 and the power generator 12 but can be used to produce hot water. The electric losses include losses in inverters (not shown) and losses in converters (not shown) caused by the motor 6 and the power generator 12. In the third heat exchanger 40, heat exchange is performed between water in the water supply pipe 22*d* and a heat medium such as lubricant oil that is circulated in a heat medium pipe 21*a* by a pump 32*b* to recover heat from the motor 6. In the fourth heat exchanger 42, heat exchange is performed between water in the water supply pipe 22*e* and a heat medium such as lubricant oil that is circulated in a heat medium pipe 21*b* by a pump 32*c* to recover heat from the power generator 12. That is the third heat exchanger 40 and the fourth heat exchanger 42 increase the temperature of water and decrease the temperature of a heat medium. Water heated to a predetermined temperature is taken out as hot water B through the second hot water outlet 44 to the outside of the heat pump. Therefore, the heat medium pipes 21*a* and 21*b*, the third heat exchanger 40, and the fourth heat exchanger 42 are included in a heat recovery mechanism 46 used in the present invention. The hot water B taken out through the second hot water outlet 44 usually has a temperature lower than that of the hot water A taken out through the first hot water outlet 38. Therefore, it is thought that the hot water B can be used for heating in bathing facilities, heated pools, agricultural facilities, etc. that can use hot water having a relatively low temperature.

The cold water, the hot water A, and the hot water B used for cooling and heating are collected through the water supply pipes 22*f* and 22*g* into a drainage unit 48. The drainage unit 48 and the water supply unit 28 are connected to each other through a pipe not shown. Water collected into the drainage unit 48 is again supplied from the water supply unit 28 to each of the heat exchangers 14, 18, 40, and 42 through the water supply pipe 22*a* and the cooling tower 34. That is, water used in this embodiment is circulated through the water supply pipes 22*a* to 22*g*.

In order to obtain hot water A, hot water B, cold water, and cold air each having a predetermined temperature, the first heat exchanger 14 and the second heat exchanger 18 are preferably plate heat exchangers that can perform large capacity heat exchange.

The types of the first compressor 8 and the expander 10 used in this embodiment are not limited, and the first compressor 8 and the expander 10 may be of a screw type, a scroll type, a turbo type, or a reciprocating type. However, in order to highly responsively and linearly follow input electric power that irregularly fluctuates, such as renewable energy, the first compressor 8 and the expander 10 are preferably of a screw type to respond to the power-generating unit 4 used in this embodiment. Although the number of each of the first compressor 8 and the expander 10 used in this embodiment is one, the number of each of the first compressor 8 and the expander 10 is not particularly limited. The first compressor 8 may be one in which two or more compressors are provided in parallel, and the expander 10 may be one in which two or more expanders are provided in parallel.

The performance of the heat pump 2 will be described.

A coefficient of performance (COP) is known as a coefficient used to evaluate the performance of a heating and cooling system such as the heat pump 2. The COP is determined by dividing electric power Li supplied to the system by the amount of generated electric power and heat LQ (COP=LQ/Li). The operation mode of the heat pump 2 according to this embodiment can be switched by the switch 24 between a mode in which heating and cooling and power generation are both performed and a mode in which only heating and cooling is performed. Hereinbelow, both the operation modes will be described while the electric power Li supplied to the system and the breakdown of the amount of recovered heat represented as the amount of generated electric power and heat LQ will be exemplified. However, exemplified numerical values are not particularly intended to limit the scope of the present invention.

Figure 2A:
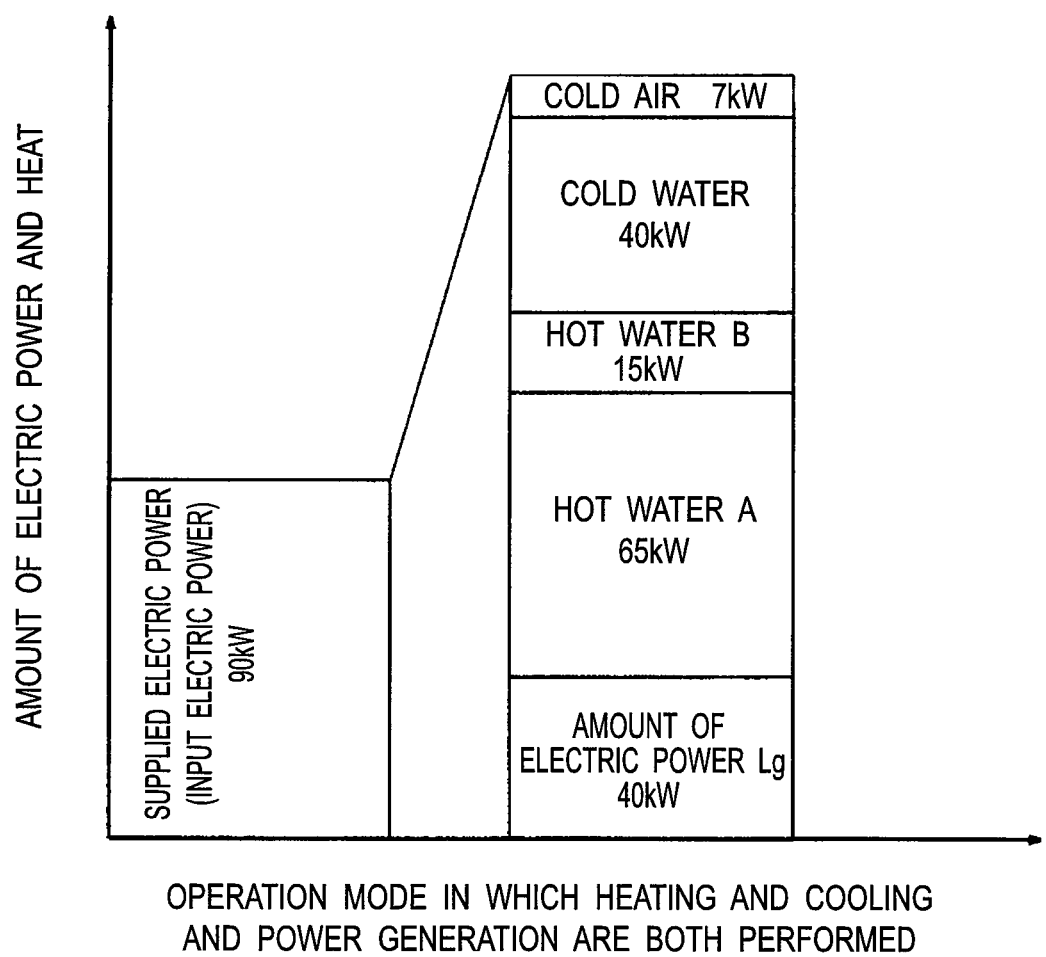
FIG. 2A is a bar graph showing details of COP in the heat pump of FIG. 1 at an operation mode in which heating and cooling and power generation are both performed.
Figure 2B:
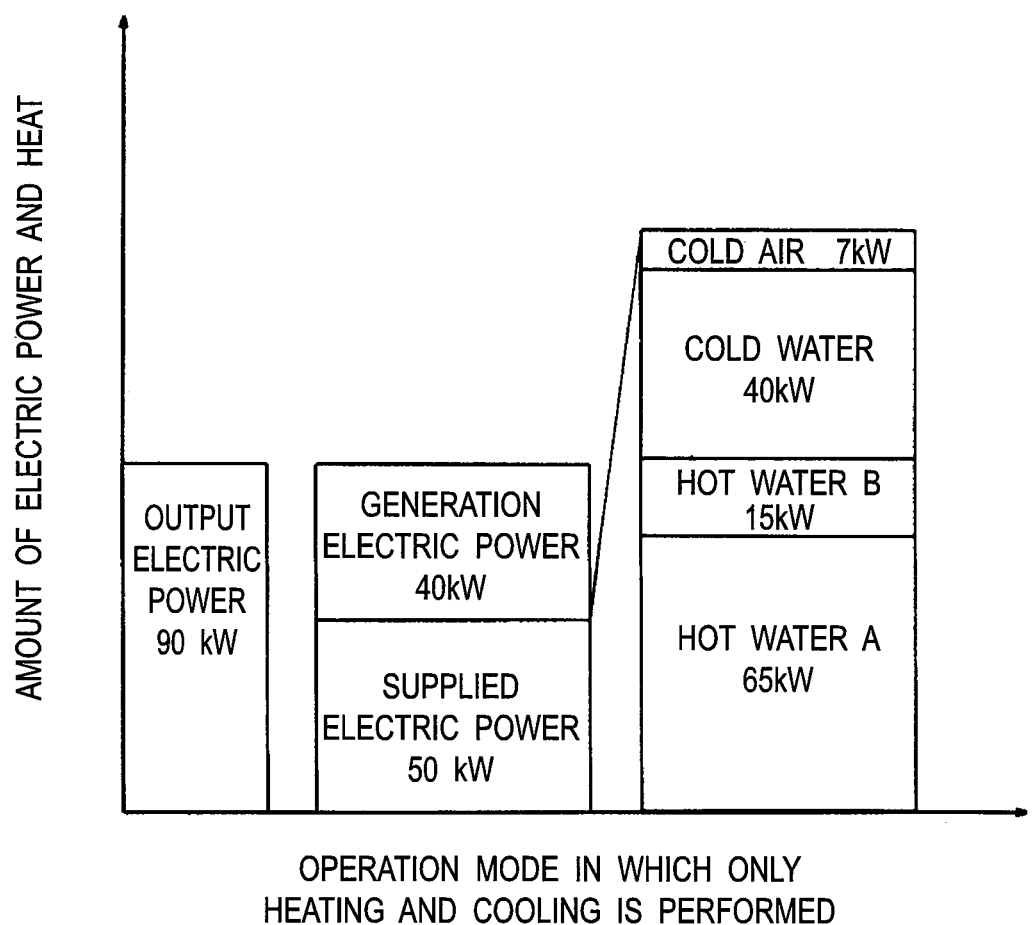
FIG. 2B is a bar graph showing details of COP in the heat pump of FIG. 1 at an operation mode in which only heating and cooling is performed.

FIG. 2A is a bar graph showing the breakdown of COP in the case of the operation mode in which heating and cooling and power generation are both performed according to this embodiment, and FIG. 2B is a bar graph showing the breakdown of COP in the case of the operation mode in which only heating and cooling is performed according to this embodiment.

First, the operation mode in which heating and cooling and power generation are both performed will be described with reference to FIG. 2A.

The electric power Li to be supplied to the system is generated by the power-generating unit 4 and supplied from the power-generating unit 4 as an electric power of about 90 kW to drive the motor 6.

The amount of generated electric power and heat LQ is represented as a sum of the total amount of heat of hot water A, hot water B, cold water, and cold air taken out from the heat pump 2 and the amount of electric power Lg generated by the power generator 12 and supplied to the electric power system 16.

The hot water A taken out through the first hot water outlet 38 is hot water heated by the first heat exchanger 14 with the use of compression heat generated by the first compressor 8. In this embodiment, hot water A at, for example, about 90° C. can be collected, and the amount of recovered heat is about 65 kW. The temperature of the collected hot water A may be determined by adjusting the specifications of the first heat exchanger 14 so that the temperature of air discharged from the first compressor 8 is about −10° C. to 60° C.

The how water B taken out through the second hot water outlet 44 is hot water heated by the third heat exchanger 40 and the fourth heat exchanger 42 with the use of heat generated by electric losses and mechanical losses in the motor 6 and the power generator 12. In this embodiment, hot water B at, for example, about 70° C. can be collected, and the amount of recovered heat is about 15 kW.

The cold air taken out through the cold air outlet 26 is cold air cooled by absorption of heat during expansion in the expander 10. In this embodiment, cold air at, for example, about −50° C. to −110° C. is discharged through the air outlet 10b of the expander 10 and then heated by the second heat exchanger 18 so that cold air at about 10° C. to 17° C. can be finally collected. The amount of recovered heat is about 7 kW.

The cold water taken out through the cold water outlet 30 is cold water cooled in the second heat exchanger 18 by cold air sent from the expander 10. In this embodiment, cold water at, for example, about 7° C. can be collected, and the amount of recovered heat is about 40 kW.

The amount of electric power Lg generated by the power generator 12 and supplied to the electric power system 16 is about 40 kW.

The amount of generated electric power and heat LQ is defined as the sum of these, and is therefore 167 (=15+65+40+7+40) kW.

Therefore, the coefficient of performance (COP) of the heat pump 2 according to this embodiment in the operation mode in which heating and cooling and power generation are both performed is 1.86 (=167 kW/90 kW).

Hereinbelow, the operation mode in which only heating and cooling is performed will be described with reference to FIG. 2B.

The electric power Li to be supplied to the system is generated by the power-generating unit 4 using renewable energy, such as a wind power-generating unit or a solar power-generating unit, and is supplied as an electric power of about 50 kW to drive the motor 6. An electric power of about 90 kW is required to drive the motor 6, but in the case of the operation mode in which only heating and cooling is performed, a remaining electric power of about 40 kW is cyclically supplied from the power generator 12 in the system. Therefore, the electric power Li to be supplied to the system is about 50 kW.

As for the amount of generated electric power LQ and heat, the amount of heat individually taken out (hot water A, hot water B, cold water, and cold air) is the same as that in the operation mode in which heating and cooling and power generation are both performed. However, electric power generated by the power generator 12 is not supplied to the electric power system 16, and therefore the amount of electric power Lg is 0 kW. The amount of generated electric power and heat LQ is defined as the total of these, and is therefore 127 (=15+65+40+7+0) kW.

Therefore, the coefficient of performance (COP) of the heat pump 2 according to this embodiment in the operation mode in which only heating and cooling is performed is 2.54 (=127 kW/50 kW). The heat pump 2 offers significantly improved performance than conventional air-refrigerant heat pumps and has a COP exceeding 2.0 that was previously difficult to achieve.

Second Embodiment

Figure 3:
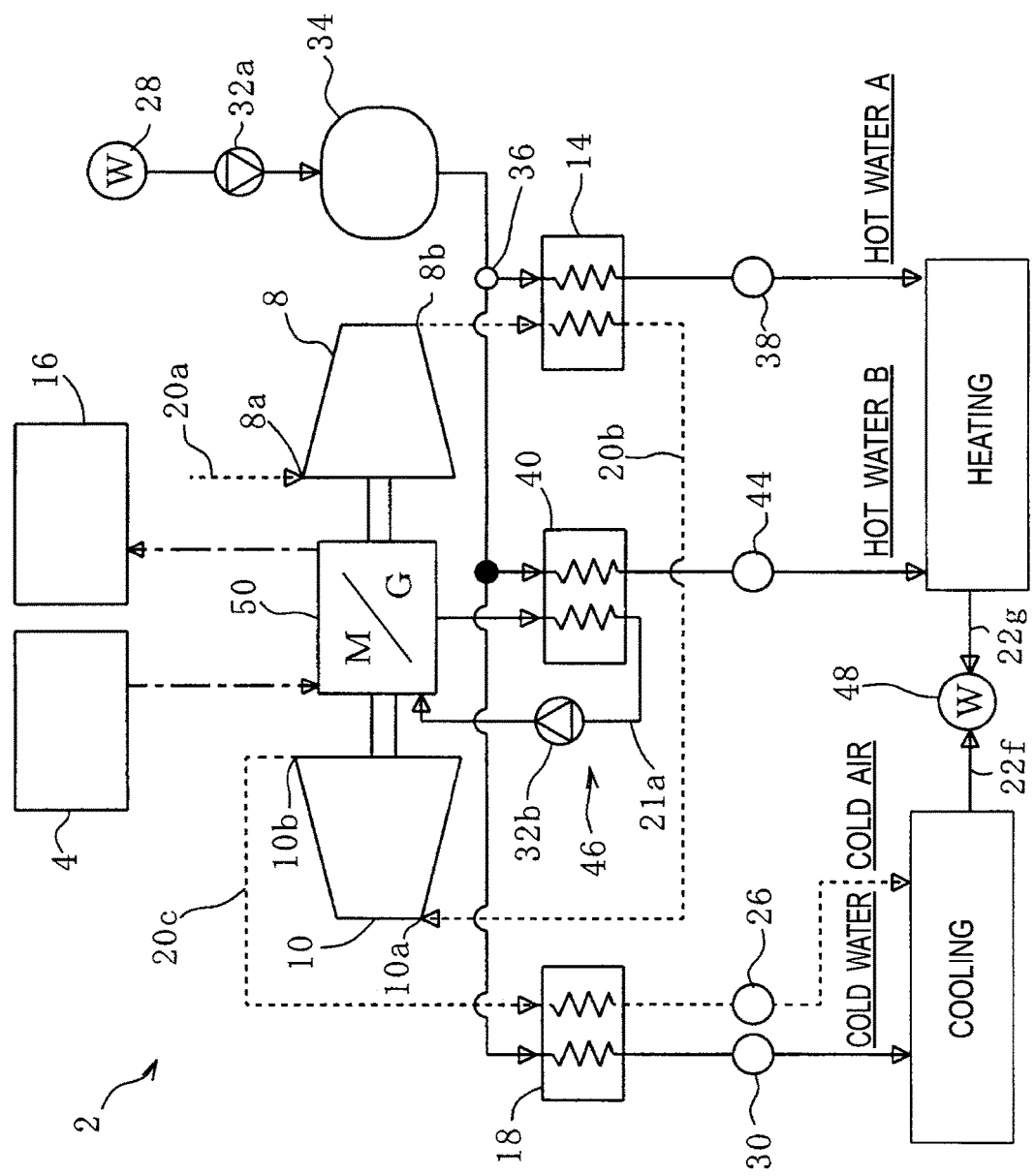
FIG. 3 is a schematic configuration diagram of a heat pump according to a second embodiment of the present invention.

FIG. 3 is a schematic configuration diagram of a heat pump 2 according to a second embodiment. The configuration of the heat pump 2 according to this embodiment is substantially the same as that of the heat pump 2 according to the first embodiment shown in FIG. 1 except that a motor generator 50 in which a motor and a power generator are integrated is used. Therefore, the description of the configuration that is the same as the configuration shown in FIG. 1 will not be repeated.

In this embodiment, the first compressor 8 and the expander 10 are coaxially and mechanically connected through the motor generator 50 in which a motor and a power generator are integrated. By connecting the first compressor 8 and the expander 10 to each other using the motor generator 50, it is possible to use the atmospheric expansion torque of compressed air as an aid for air compression torque. This can reduce electric power input to the motor generator 50. The power generator 12 (see FIG. 1) is substantially omitted from the first embodiment, which simplifies the heat recovery mechanism 46. Further, the heat medium pipe 21b (see FIG. 1), the pump 32c, and the fourth heat exchanger 42 (see FIG. 1) are omitted from the first embodiment. This can reduce not only the system cost but also electric losses and mechanical losses in the power generator and losses in an inverter and a converter for the power generator.

Third Embodiment

Figure 4:
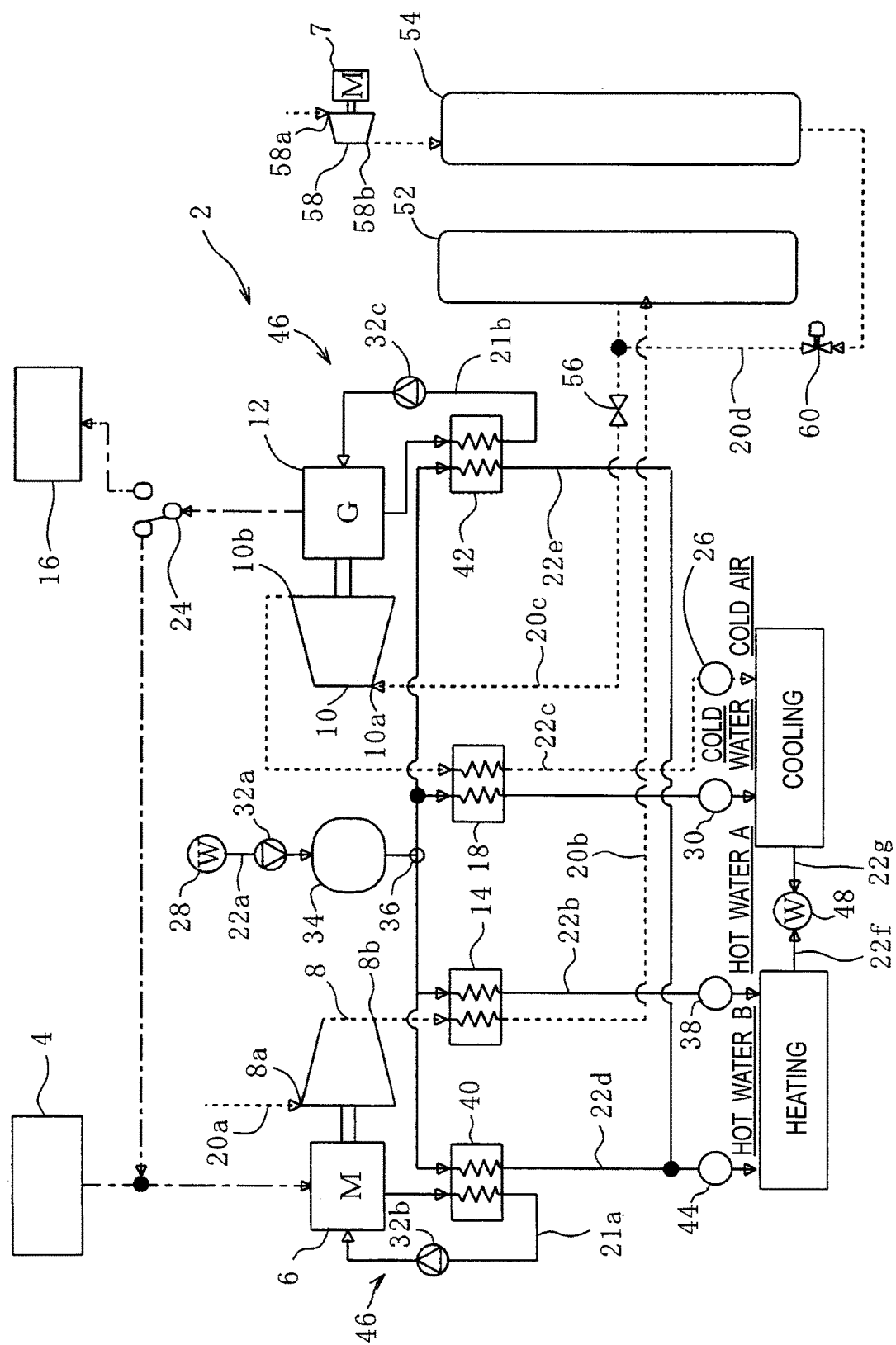
FIG. 4 is a schematic configuration diagram of a heat pump according to a third embodiment of the present invention.

FIG. 4 is a schematic configuration diagram of a heat pump 2 according to a third embodiment. The heat pump 2 according to this embodiment is a compressed air energy storage (CAES) power-generating system 2. More specifically, the CAES power-generating system 2 further comprises a first accumulator tank (first accumulator) 52 and a second accumulator tank (second accumulator) 54 in addition to the components of the heat pump 2 according to the first embodiment shown in FIG. 1. The CAES power-generating system 2 can store energy in the form of compressed air and convert the compressed air into electric power when necessary, and therefore can smooth unstable generated electric power that irregularly fluctuates, such as electric power generated by the power generating unit 4 using renewable energy such as a wind power-generating unit or a solar power-generating unit. This embodiment and the first embodiment mostly overlap each other in their configuration, and therefore the description of the configuration that is the same as the configuration shown in FIG. 1 will not be repeated.

The CAES power-generating system 2 according to this embodiment is provided with a first accumulator tank 52 that stores compressed air discharged from the first compressor 8 into the air pipe 20b that extends from the first compressor 8 to the expander 10. That is, the first accumulator tank 52 can store energy in the form of compressed air. The compressed air stored in the first accumulator tank 52 is supplied to the expander 10 through the air pipe 20c. The air pipe 20c is provided with a valve 56, and therefore the supply of compressed air to the expander 10 can be permitted or shut off by opening or closing the valve 56. By storing energy in the form of compressed air in the first accumulator tank 52 and supplying the compressed air to the expander 10 when necessary to drive the power generator 12 to generate electric power, it is possible to smooth the generated power output of the power-generating unit 4 using renewable energy.

Further, the CAES power generating system 2 according to this embodiment is provided with a second compressor 58 that compresses air to a pressure higher than that of compressed air produced by the first compressor 8 and a second accumulator tank 54 whose allowable accumulation pressure is higher than that of the first accumulator tank 52. Here, the allowable accumulation pressure refers to a maximum working pressure that does not lead to the breakdown or failure of the accumulator tank.

Similarly to the first compressor 8, the second compressor 58 is mechanically connected to a motor 7. The second compressor 58 is driven by the motor 7, and sucks air through an air inlet 58a and compresses the air to a pressure higher than that of compressed air produced by the first compressor 8 to supply compressed air from an outlet 58b to the second accumulator tank 54. Therefore, the pressure in the second accumulator tank 54 is usually higher than that in the first accumulator tank 52. For example, the pressure in the first accumulator tank 52 (accumulation pressure) may be less than 0.98 MPa, and the pressure in the second accumulator tank 54 (accumulation pressure) may be about 4.5 MPa.

The second accumulator tank 54 is fluidly connected to the first accumulator tank 52 and the expander 10 through an air pipe 20d. More specifically, one end of the air pipe 20d is fluidly connected to the second accumulator tank 54, and the other end of the air pipe 20d is fluidly connected to the air pipe 20c. The air pipe 20d is provided with a flow control valve 60, and therefore the flow rate of air supplied to the first accumulator tank 52 and the expander 10 can be adjusted by adjusting the aperture of the flow control valve 60. By supplying decompressed high-pressure air to the expander 10, it is possible to drive the power generator 12 to generate electric power. By supplying decompressed high-pressure air to the first accumulator tank 52, it is possible to compensate for a reduction in the amount of compressed air stored in the first accumulator tank 52.

By providing the second accumulator tank 54 and the second compressor 58, it is possible to supply emergency power and cooling over a long period of time in the event of emergency such as a power failure. More specifically, the flow control valve 60 is closed in normal times so that the pressure in the second accumulator tank 54 is kept high. When a large amount of electric power needs to be generated due to a power failure or the like or the pressure in the first accumulator tank 52 is reduced due to long-time power generation, the flow control valve 60 is opened to supply a large amount of compressed air from the second accumulator tank 54 to the expander 10. This can prevent a reduction in the amount of electric power generated by the power generator 12 driven by the expander 10 and to take out cold air and cold water at the same time. This is particularly effective for a demander, such as a data center and a large computer, which requires a large amount of cold heat.

The invention claimed is:

1. A heat pump comprising:
    an electric motor driven by input electric power;
    a first compressor mechanically connected to the electric motor and compresses air;
    a water supply pipe configured to supply water;
    a first heat exchanger performing heat exchange between compressed air produced by the first compressor and the water supplied from the water supply pipe;
    a first hot water outlet through which the water heated by heat exchange in the first heat exchanger is taken out;
    an expander driven by the compressed air produced by the first compressor;
    a power generator mechanically connected to the expander;
    a second heat exchanger performing heat exchange between air expanded by the expander and the water from the water supply pipe;
    a cold water outlet through which the water cooled to ordinary temperature or lower by the heat exchange in the second heat exchanger and supplied from the water supply pipe is taken out; and a first accumulator storing the compressed air produced by the first compressor, wherein the expander is driven by the compressed air supplied from the first accumulator, the power generator is driven by the expander to generate electric power, a switch configured to switch a supply destination of the electric power generated by the power generator between the electric motor and a demander.

2. The heat pump according to claim 1, wherein the air expanded by the expander and supplied to the second heat exchanger has a temperature of −50° C. to −110° C.

3. The heat pump according to claim 1, further comprising:

a second accumulator that fluidly connected to at least one of the expander and the first accumulator; and a second compressor compressing air to a pressure higher than that of the compressed air produced by the first compressor and supplies the compressed air to the second accumulator.

4. The heat pump according to claim 1, comprising a heat recovery mechanism recovering heat generated by the electric motor and the power generator and increases a temperature of water with a use of the recovered heat, wherein the heat recovery mechanism comprises:

a third heat exchanger performing heat exchange between a thermal medium circulating through the electric motor and water;

a fourth heat exchanger performing heat exchange between a thermal medium circulating through the power generator and the water; and a second hot water outlet through which the water heated by the heat exchange in the third and fourth heat exchanger is taken out.

* * * * *